(12) United States Patent
Lee et al.

(10) Patent No.: US 12,686,308 B2
(45) Date of Patent: Jul. 21, 2026

(54) VEHICLE LUGGAGE ARMREST

(71) Applicants: Hyundai Motor Company, Seoul (KR); Kia Corporation, Seoul (KR); SEOYON E-HWA CO., LTD, Anyang-si (KR)

(72) Inventors: Jaeseung Lee, Hwaseong-Si (KR); Dowon Kim, Seoul (KR); Jun Tae Park, Seoul (KR)

(73) Assignees: Hyundai Motor Company, Seoul (KR); Kia Corporation, Seoul (KR); Seoyon E-Hwa Co., Ltd., Anyang-si (KR)

( * ) Notice: Subject to any disclaimer, the term of this patent is extended or adjusted under 35 U.S.C. 154(b) by 379 days.

(21) Appl. No.: 18/242,336

(22) Filed: Sep. 5, 2023

(65) Prior Publication Data

US 2024/0253546 A1     Aug. 1, 2024

(30) Foreign Application Priority Data

Feb. 1, 2023     (KR) ......................... 10-2023-0013489

(51) Int. Cl.
*B60N 2/75* (2018.01)
(52) U.S. Cl.
CPC .............. *B60N 2/78* (2018.02); *B60N 2/753* (2018.02); *B60N 2/773* (2018.02)
(58) Field of Classification Search
CPC .......... B60N 2/753; B60N 2/773; B60N 2/78; B60N 2/777; B60R 13/02; B60R 2011/0036; B60R 2011/0084
See application file for complete search history.

(56) References Cited

U.S. PATENT DOCUMENTS

| | | | | |
|---|---|---|---|---|
| 10,543,794 B2 * | 1/2020 | Fitzpatrick | ............. | B60N 2/753 |
| 12,179,649 B2 * | 12/2024 | Kim | ...................... | B60N 2/767 |
| 12,365,277 B2 * | 7/2025 | Mergl | ..................... | B60N 2/793 |
| 2015/0203006 A1 * | 7/2015 | Hipshier | ................. | B60N 2/78 |
| | | | | 296/153 |
| 2020/0114797 A1 * | 4/2020 | Sakurai | ..................... | B60J 5/04 |
| 2022/0371494 A1 * | 11/2022 | Mergl | .................. | B60R 16/037 |
| 2023/0038501 A1 * | 2/2023 | Kim | ......................... | B60N 2/78 |
| 2023/0382282 A1 * | 11/2023 | Kato | ..................... | B60N 2/767 |
| 2024/0166108 A1 * | 5/2024 | Lee | ......................... | F16D 27/00 |
| 2024/0253545 A1 * | 8/2024 | Lee | ........................ | B60N 2/78 |
| 2024/0424993 A1 * | 12/2024 | Nomoto | ................ | B60N 3/001 |
| 2025/0222845 A1 * | 7/2025 | Lee | ........................ | B60N 3/002 |
| 2025/0289350 A1 * | 9/2025 | Honda | ................. | B60N 2/2222 |
| 2025/0296512 A1 * | 9/2025 | Doll | ......................... | B60N 2/77 |

FOREIGN PATENT DOCUMENTS

| | | | | | | |
|---|---|---|---|---|---|---|
| CN | 104044437 | B | * | 9/2017 | ......... | B60R 13/0243 |
| DE | 102005043904 | A1 | * | 3/2007 | ......... | B60N 2/02246 |
| JP | 2017214043 | A | * | 12/2017 | | |
| KR | 20130007362 | U | * | 12/2013 | ............. | B60N 2/773 |
| KR | 101395360 | B1 | * | 5/2014 | ............. | B60N 2/773 |

\* cited by examiner

*Primary Examiner* — Jason S Morrow
(74) *Attorney, Agent, or Firm* — MORGAN, LEWIS & BOCKIUS LLP

(57) ABSTRACT

A vehicle luggage armrest provided in a luggage trim of a vehicle includes an armrest portion on which an arm of a passenger is placed and which is configured to slide in a longitudinal direction of a vehicle body to be inserted into or drawn out from the luggage trim.

16 Claims, 19 Drawing Sheets

VEHICLE LUGGAGE ARMREST

CROSS-REFERENCE TO RELATED APPLICATION

The present application claims priority to Korean Patent Application No. 10-2023-0013489 filed on Feb. 1, 2023, the entire contents of which is incorporated herein for all purposes by this reference.

BACKGROUND OF THE PRESENT DISCLOSURE

Field of the Present Disclosure

The present disclosure relates to a vehicle luggage armrest, and more particularly, to a vehicle luggage armrest capable of supporting an arm of a passenger inside a vehicle including a sliding door structure.

Description of Related Art

In general, a vehicle has a compartment including a predetermined size and into which a driver or an accompanying passenger may get, and compartment doors are provided on a vehicle body to open or close the compartment.

In a case of a passenger vehicle, the compartment doors include a front door provided on the front side of the vehicle in a longitudinal direction and a rear door provided on the rear side of the vehicle in the longitudinal direction, and the front door and the rear door are usually rotatably provided on the vehicle body by hinges.

In a case of a van in which many people may ride, the compartment door opens or closes the compartment while sliding back and forth in the longitudinal direction of the vehicle.

The sliding compartment door of the van moves backward in the longitudinal direction of the vehicle to open the compartment, and moves forward in the longitudinal direction of the vehicle to close the compartment. Therefore, the sliding compartment door needs a smaller space for opening and closing the compartment as compared with the hinged compartment door of the passenger vehicle, and a door opening portion formed in the vehicle body may thus be completely opened even with a narrow space for opening and closing the compartment.

Meanwhile, a door armrest that supports an arm of a passenger is provided at a door of a vehicle. However, in a vehicle in which sliding compartment doors 2 and 3 are provided on a vehicle body 1 as illustrated in FIG. 1, it is difficult to secure a space for a door armrest on a door 3 side because a swing gap G needs to be secured. FIG. 2 is an enlarged view of portion "A" of FIG. 1, which is a vehicle hinge coupling portion. FIG. 3 is a cross-sectional view taken along line B-B' of FIG. 2.

As illustrated in FIG. 2 and FIG. 3, in a case of the hinged compartment door, it is inevitable to reduce the length of the existing armrest to avoid interference in a space between the door 3 and a luggage trim 5 when opening the door, and thus, the space for the armrest is reduced by "L". In the instant case, it is difficult to secure the space for the armrest for supporting an arm of a passenger, which results in deterioration in usability.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle active luggage armrest structure configured as an armrest by sliding in response to opening and closing of a hinged compartment door.

According to an exemplary embodiment of the present disclosure, a vehicle luggage armrest provided in a luggage trim of a vehicle includes an armrest portion on which an arm of a passenger is placed and which is configured to slide in a longitudinal direction of a vehicle body to be inserted into or drawn out from the luggage trim.

The vehicle luggage armrest may further include a cover portion provided in the luggage trim and opened or closed in response that the armrest portion slides to be inserted into or drawn out from the luggage trim.

The armrest portion may include an armrest cover including an upper surface on which the arm of the passenger is placed, an upper rail bracket coupled to a lower portion of the armrest cover, a lower rail bracket disposed under the upper rail bracket and positioned inside the luggage trim, a linear rail fixed to an upper surface of the lower rail bracket and providing a sliding path for the upper rail bracket, and a drive motor disposed inside the luggage trim and providing a driving force.

The vehicle luggage armrest may further include a pulley portion connected to a rotation shaft of the drive motor and by which the upper rail bracket slides.

The pulley portion may include a main pulley disposed inside the luggage trim, coupled to the rotation shaft of the drive motor, and rotating by driving of the drive motor, and first and second pulleys engaged to the main pulley by a wire and rotating in synchronization with the main pulley, and the wire may be connected between the first pulley and the upper rail bracket and between the second pulley and the upper rail bracket.

The first pulley may be disposed on a rear side of the luggage trim, and the second pulley may be disposed on a front side of the luggage trim.

Each of the first pulley and the second pulley may be rotatably coupled to a pulley bracket fixed to the vehicle body.

A side cover may cover side surfaces of the armrest cover and the upper rail bracket.

The linear rail may be fixed by a linear guide disposed on the upper surface of the lower rail bracket in a longitudinal direction of the lower rail bracket.

The cover portion may include a luggage cover rotating to open or close a portion of an opening of the luggage trim on a front side of the vehicle body, a cover motor fixed inside the luggage trim and coupled to the luggage cover to provide a rotation force to the luggage cover, and a cover motor bracket to which a rotation shaft of the luggage cover is rotatably connected and to which the cover motor is fixed.

The cover portion may further include an open sensor and a close sensor that detect a position of the luggage cover.

The open sensor and the close sensor may be provided on an open sensor bracket and a close sensor bracket, respectively, the open sensor bracket and the close sensor bracket being coupled to the cover motor bracket.

The vehicle luggage armrest may further include armrest position sensors provided on the luggage trim and detecting a position of the armrest portion.

A rotation shaft of the cover motor may be connected to the rotation shaft of the luggage cover by a gear, and the luggage cover may rotate by rotation of the cover motor.

The vehicle luggage armrest may further include a link portion connected to a rotation shaft of the drive motor and by which the upper rail bracket slides.

The link portion may include a first link including a first end portion coupled to the rotation shaft of the drive motor and turning, and a second link including a first end portion rotatably connected to a second end portion of the first link and a second end portion coupled to the upper rail bracket, and turning together with the first link by driving of the driving motor to slide the upper rail bracket.

According to an exemplary embodiment of the present disclosure, as the active luggage armrest structure that functions as an armrest when the hinged compartment door is closed, and slides in such a way as not to interfere with opening of the compartment door when the compartment door is opened by use of a drive motor and a pulley or link is provided, it is possible to secure an armrest space for supporting an arm of a passenger.

Furthermore, cost reduction and a predetermined degree of layout freedom may be achieved by not requiring a separate device in securing a space for an armrest and eliminating interference occurring in a process of opening and closing a sliding door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
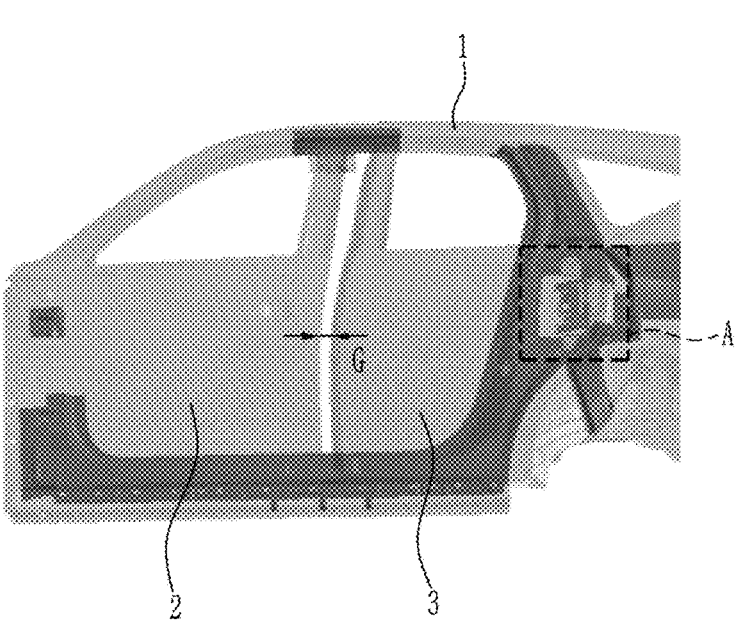
FIG. 1 is a side view exemplarily illustrating a vehicle including an existing sliding compartment door.
Figure 2:
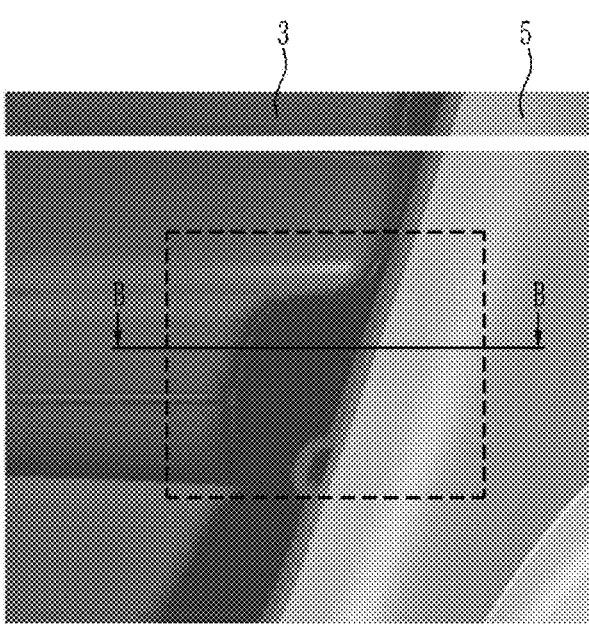
FIG. 2 is an enlarged view of portion "A" of FIG. 1, which is a vehicle hinge coupling portion.
Figure 3:
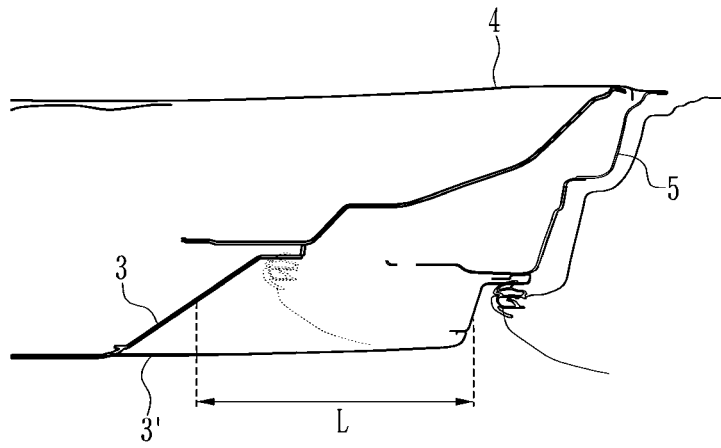
FIG. 3 is a cross-sectional view taken along line B-B' of FIG. 2.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those skilled in the art to which the present disclosure pertains may easily practice the present disclosure. However, the present disclosure may be implemented in various different forms and is not limited to exemplary embodiments provided herein.

Furthermore, in several exemplary embodiments of the present disclosure, components including the same configuration will be representatively described using the same reference numerals in an exemplary embodiment of the present disclosure, and only components different from those of an exemplary embodiment will be described in the other exemplary embodiments of the present disclosure.

It is to be noted that the drawings are schematic and not drawn to scale. Relative dimensions and proportions of portions in the drawings are shown exaggerated or reduced in size for clarity and convenience in the drawings, and any dimensions are illustrative only and not limiting. Furthermore, the same reference numerals are used to indicate similar features in the same structure, element or part appearing in two or more drawings. When a part is referred to as being "on" another part, it may be directly on the another part or may have other parts intervening therebetween.

An exemplary embodiment of the present disclosure will be described in detail. As a result, various modifications of the exemplary embodiment are expected. Therefore, an exemplary embodiment of the present disclosure is not limited to a specific aspect of an illustrated region, and for example, includes modifications made for manufacturing.

Hereinafter, a vehicle luggage armrest according to an exemplary embodiment of the present disclosure will be described in detail with reference to the accompanying drawings.

Figure 4:
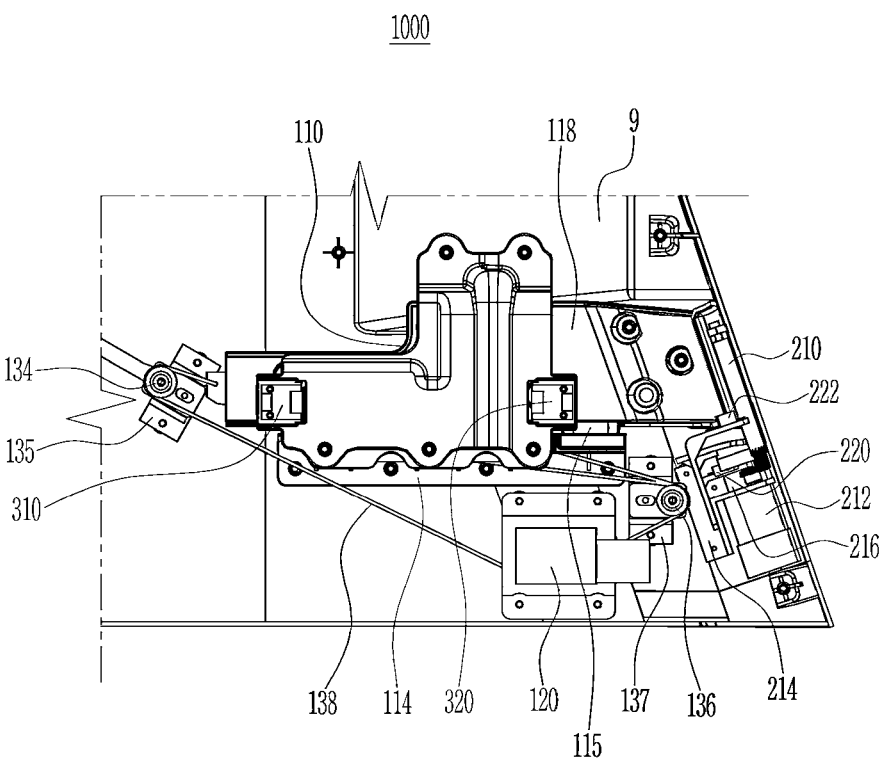
FIG. 4 is a front view of a vehicle luggage armrest according to an exemplary embodiment of the present disclosure.
Figure 5:
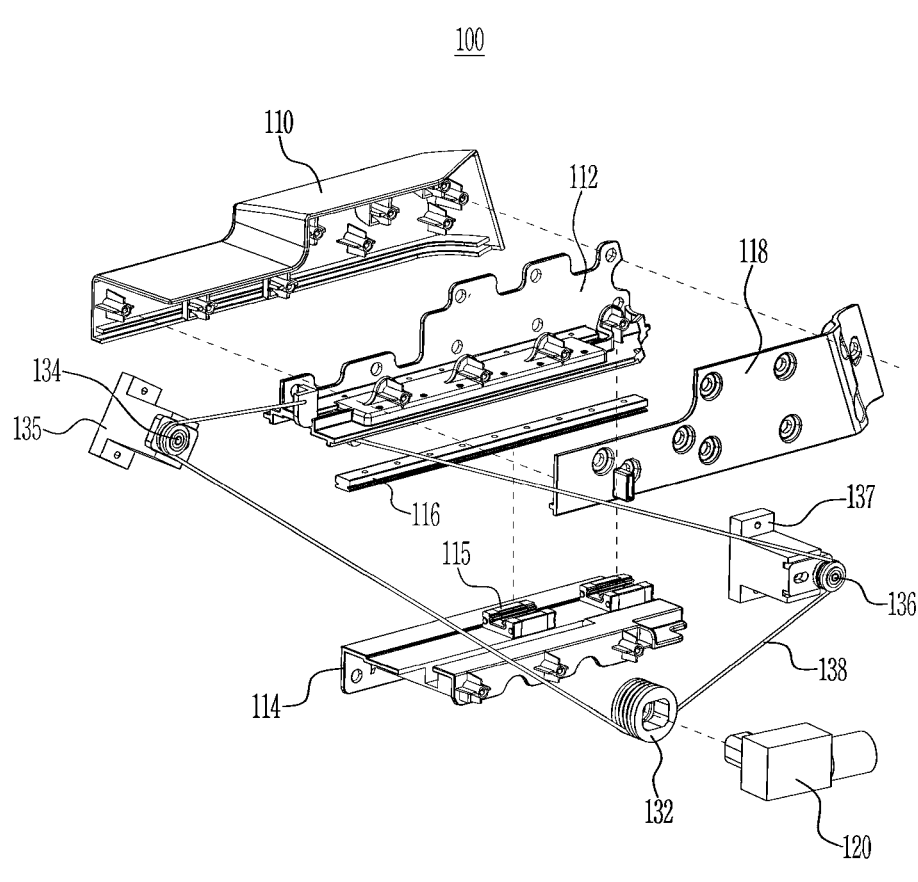
FIG. 5 is an exploded perspective view of an armrest portion of the vehicle luggage armrest according to an exemplary embodiment of the present disclosure.
Figure 6:
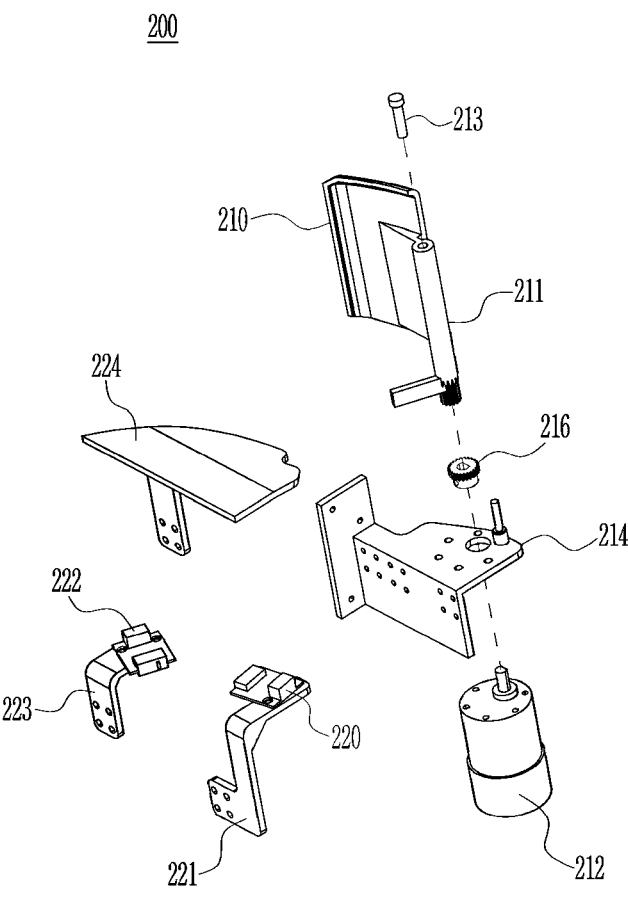
FIG. 6 is an exploded perspective view of a cover portion of the vehicle luggage armrest according to an exemplary embodiment of the present disclosure.

FIG. 4 is a front view of the vehicle luggage armrest according to an exemplary embodiment of the present disclosure. FIG. 5 is an exploded perspective view of an armrest portion of the vehicle luggage armrest according to an exemplary embodiment of the present disclosure. FIG. 6 is an exploded perspective view of a cover portion of the vehicle luggage armrest according to an exemplary embodiment of the present disclosure.

Referring to FIG. 4, FIG. 5 and FIG. 6, a vehicle luggage armrest according to an exemplary embodiment of the present disclosure may be applied to a rear door provided on a rear side of a vehicle in a longitudinal direction, and may be applied to a structure in which the rear door is opened or closed by moving inward and outward with respect to the vehicle and sliding forwards and backwards in the longitudinal direction of the vehicle. However, the vehicle luggage armrest according to an exemplary embodiment of the present disclosure is not only applied to the rear door, but may also be applied to a front door. The vehicle luggage armrest according to an exemplary embodiment of the present disclosure may be provided in a luggage trim 9 of the vehicle.

Referring to FIG. 4, FIG. 5 and FIG. 6, a vehicle luggage armrest 1000 according to an exemplary embodiment of the present disclosure is provided in the luggage trim 9 of the vehicle and includes an armrest portion 100 and a cover portion 200.

The armrest portion 100 includes an upper surface on which an arm of a passenger is placed, is provided in the luggage trim 9, and may slide in a longitudinal direction of a vehicle body. Here, the armrest portion 100 may slide to be inserted into or drawn out from the luggage trim 9 on a rear side of the vehicle, the luggage trim 9 being connected to a door trim 8.

The armrest portion 100 includes an armrest cover 110 including an upper surface on which an arm of a passenger is placed, an upper rail bracket 112 coupled to a lower portion of the armrest cover 110, a lower rail bracket 114 disposed under the upper rail bracket 112, a linear rail 116 fixed on an upper surface of the lower rail bracket, and a drive motor 120. Furthermore, side surfaces of the armrest cover 110 and the upper rail bracket 112 may be covered by a side cover 118.

The lower rail bracket 114, the linear rail 116, and the drive motor 120 may be fixedly positioned inside the luggage trim 9, and the armrest cover 110 and the upper rail bracket 112 may slide according to a door opening or closing signal to be inserted into or drawing out from the luggage trim 9.

A pulley portion is connected to a rotation shaft of the drive motor 120. The rotation shaft rotates as the drive motor 120 is driven, and accordingly, the pulley portion rotates, so that the armrest cover 110 and the upper rail bracket 112 of the armrest portion 100 may slide.

The pulley portion includes a main pulley 132 directly connected to the rotation shaft of the drive motor 120, and first and second pulleys 134 and 136 connected to the main pulley 132 by a wire 138 and rotating in synchronization with the main pulley 132.

The main pulley 132 and the second pulley 136 may be fixedly positioned inside the luggage trim 9, and the first pulley 134 may be fixedly positioned outside the luggage trim 9. The first pulley 134 and the second pulley 136 may be rotatably provided on pulley brackets 135 and 137 fixed to the vehicle body, respectively.

Meanwhile, the wire 138 is connected to the first pulley 134 and one portion of the upper rail bracket 112, and the wire 138 is connected to another portion of the upper rail bracket 112 and the second pulley 136. That is, the wire 138 includes a circular structure connecting the main pulley 132, the first pulley 134, the upper rail bracket 112, and the second pulley 136. Therefore, as the main pulley 132 rotates by operation of the drive motor 120, the first pulley 134 and the second pulley 136 may rotate to generate tension in the wire 138, moving the upper rail bracket 112.

The linear rail 116 may be disposed on the upper surface of the lower rail bracket 114 in a longitudinal direction of the lower rail bracket 114 and fixed by a linear guide 115. The upper rail bracket 112 coupled to the lower portion of the armrest cover 110 is movably coupled to the linear rail 116, so that the armrest cover 110 and the upper rail bracket 112 may move along the linear rail 116.

Meanwhile, the cover portion 200 includes a luggage cover 210, a cover motor 212, and a cover motor bracket 214. The luggage cover 210 may rotate to open or close a portion of an opening of the luggage trim 9 on a front side of the vehicle body, and the cover motor 212 may be fixed inside the luggage trim 9 and provide a rotation force to the luggage cover 210.

The luggage cover 210 and the cover motor 212 are coupled to the cover motor bracket 214. The cover motor 212 is disposed under the cover motor bracket 214, and the luggage cover 210 is disposed above the cover motor bracket 214. The cover motor bracket 214 includes an opening, and a rotation shaft of the cover motor 212 and a rotation shaft of the luggage cover 210 may be connected to each other through the opening. A gear 216 is disposed on the cover motor bracket 214, and the rotation shaft of the cover motor 212 is coupled to a center portion of the gear 216. A screw thread to be engaged with the gear 216 is formed on an external surface of the rotation shaft 211 of the luggage cover 210, so that the luggage cover 210 may rotate together with the gear 216. That is, when the cover motor 212 is driven, and the rotation shaft of the cover motor 212 rotates, the gear 216 rotates, and accordingly, the luggage cover 210 rotates.

Meanwhile, the cover portion 200 may further include an open sensor 220 and a close sensor 222 that detect the position of the luggage cover 210. The open sensor 220 and the close sensor 222 are provided at positions that come into contact with the luggage cover 210 when the luggage cover 210 rotates, and may detect opening and closing of the luggage cover 210 when coming into contact with the luggage cover 210. The open sensor 220 and the close sensor 222 may be provided on an open sensor bracket 221 and a close sensor bracket 223, respectively, and the open sensor bracket 221 and the close sensor bracket 223 may be coupled to the cover motor bracket 214.

An upper portion of the cover motor bracket 214 is covered with an upper cover 224, so that the open sensor 220, the close sensor 222, and the gear 216 may be protected.

In various exemplary embodiments of the present disclosure, a controller is connected to at least one of the elements of the drive motor 120, the open sensor 220, the close sensor 222 and the cover motor 212 to control the operations of the vehicle luggage armrest 1000.

Figure 7A:
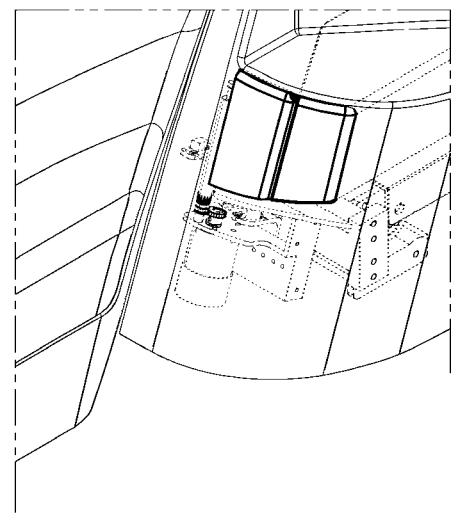
FIG. 7A, FIG. 7B, and FIG. 7C are views exemplarily illustrating a process in which the armrest portion of the vehicle luggage armrest according to an exemplary embodiment of the present disclosure is drawn out from a luggage trim.
Figure 7B:
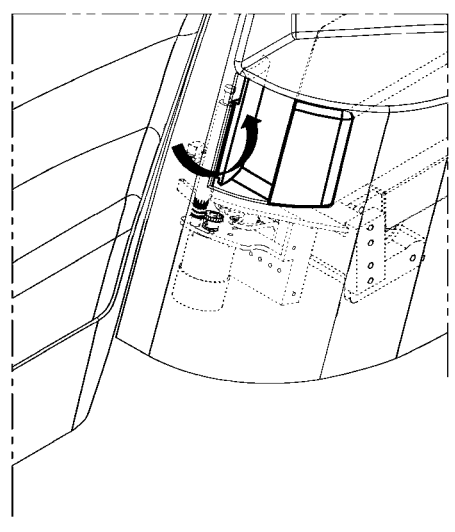
Figure 7C:
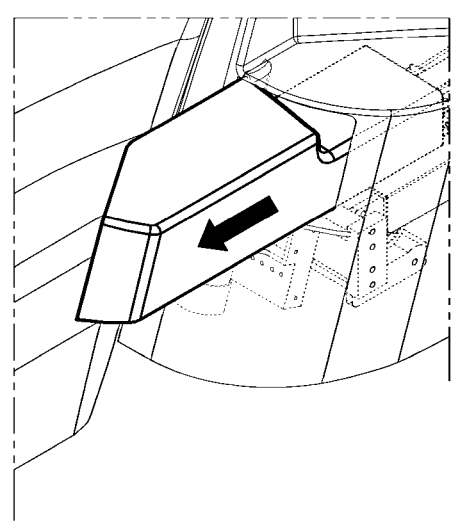

FIG. 7A, FIG. 7B, and FIG. 7C are views exemplarily illustrating a process in which the armrest portion of the vehicle luggage armrest according to an exemplary embodiment of the present disclosure is drawn out from the luggage trim.

Referring to FIGS. 5, 6, and 7A, when a door closing signal is detected in a state where the luggage cover 210 is closed (FIG. 7A), the cover motor 212 is driven, and the rotation shaft of the cover motor 212 rotates counterclockwise in FIG. 6. At the instant time, the gear 216 coupled to the rotation shaft of the cover motor 212 rotates, and the rotation shaft 211 of the luggage cover 210 coupled to the gear 216 rotates, so that the luggage cover 210 rotates counterclockwise (to the left). In the instant case, the luggage cover 210 rotates toward the inside of the luggage trim 9, so that the opening of the luggage trim 9 is opened (FIG. 7B).

At the same time, when the door closing signal is detected, the drive motor 120 is driven, and the rotation shaft of the drive motor 120 rotates clockwise in FIG. 5. At the instant time, the main pulley 132 coupled to the rotation shaft of the drive motor 120 rotates, the first pulley 134 and the second pulley 136 connected to the wire 138 rotate, and the upper rail bracket 112 connected to the first pulley 134 and the second pulley 136 moves to the right. Accordingly, the armrest cover 110 coupled to an upper portion of the upper rail bracket 112 slides to the right. The armrest cover 110 is drawn out from the luggage trim 9 through the opened opening of the luggage trim 9 (FIG. 7C).

In FIG. 7A, FIG. 7B, and FIG. 7C, a case where the armrest cover 110 is drawn out to the left and the luggage cover 210 rotates to the right is taken as an exemplary embodiment of the present disclosure, but it is to be noted that the left and right direction in FIG. 7A, FIG. 7B, and FIG. 7C is opposite to that in FIG. 5 and FIG. 6.

Figure 8A:
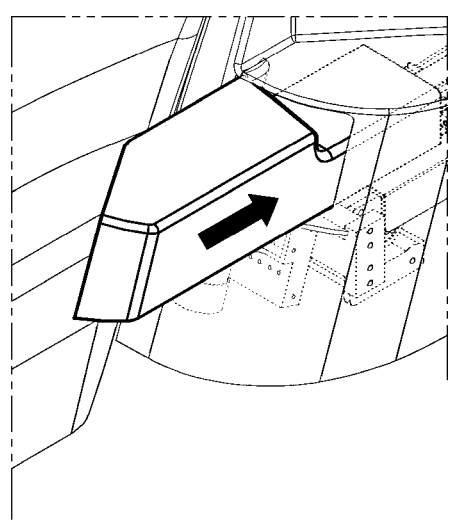
FIG. 8A, FIG. 8B and FIG. 8C are views exemplarily illustrating a process in which the armrest portion of the vehicle luggage armrest according to an exemplary embodiment of the present disclosure is inserted into the luggage trim.
Figure 8B:
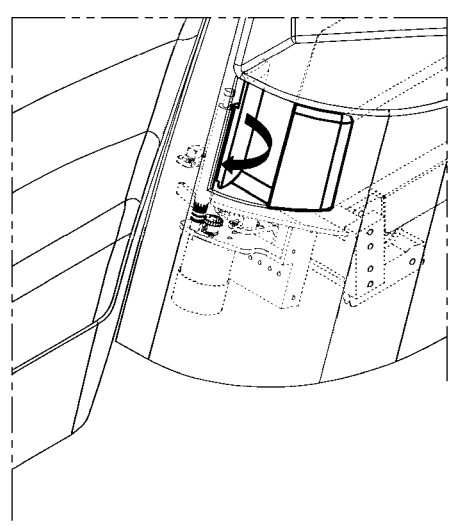
Figure 8C:
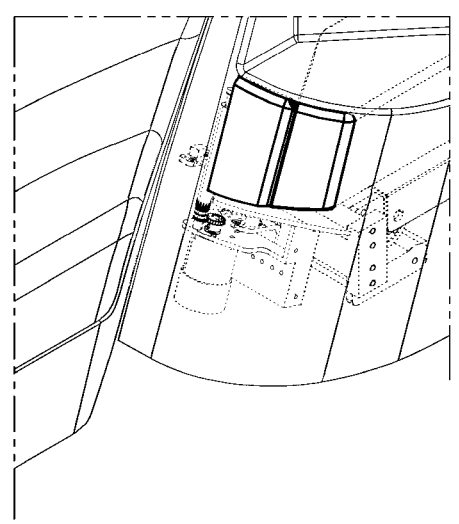

FIG. 8A, FIG. 8B and FIG. 8C are views exemplarily illustrating a process in which the armrest portion of the vehicle luggage armrest according to an exemplary embodiment of the present disclosure is inserted into the luggage trim.

Referring to FIGS. 5, 6, and 8A, when a door opening signal is detected in a state where the armrest cover 110 is drawn out (FIG. 8A), the drive motor 120 is driven, and the rotation shaft of the drive motor 120 rotates counterclockwise in FIG. 5. At the instant time, the main pulley 132 coupled to the rotation shaft of the drive motor 120 rotates, the first pulley 134 and the second pulley 136 connected to the wire 138 rotate, and the upper rail bracket 112 connected to the first pulley 134 and the second pulley 136 moves to the left. Accordingly, the armrest cover 110 coupled to the upper portion of the upper rail bracket 112 slides to the left and is inserted into the luggage trim 9 (FIG. 8B).

At the same time, when the door closing signal is detected, the cover motor 212 is driven, and the rotation shaft of the cover motor 212 rotates clockwise in FIG. 6. At the instant time, the gear 216 coupled to the rotation shaft of the cover motor 212 rotates, and the rotation shaft 211 of the luggage cover 210 coupled to the gear 216 rotates, so that the luggage cover 210 rotates clockwise (to the right). In the instant case, the luggage cover 210 rotates, and the opening of the luggage trim 9 is closed (FIG. 8C).

In FIG. 8, a case where the armrest cover 110 is inserted to the right and the luggage cover 210 rotates to the left is taken as an exemplary embodiment of the present disclosure, but it is to be noted that the left and right direction in FIG. 8 is opposite to that in FIG. 5 and FIG. 6.

Figure 9A:
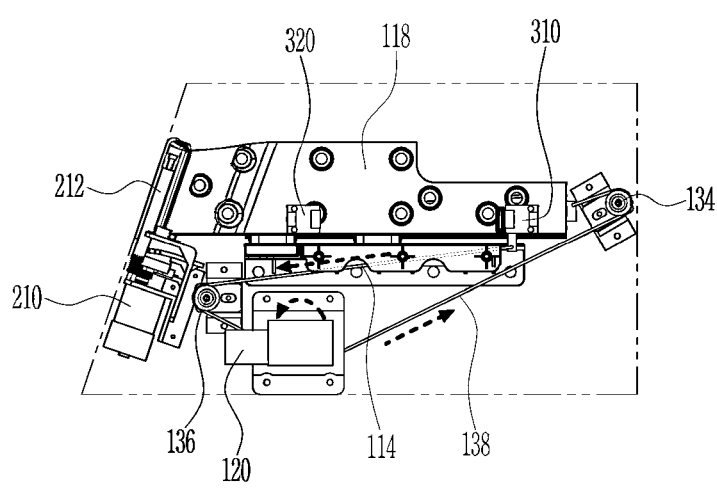
FIG. 9A and FIG. 9B are views exemplarily illustrating a process in which the armrest portion of the vehicle luggage armrest according to an exemplary embodiment of the present disclosure is drawn out from the luggage trim.
Figure 9B:
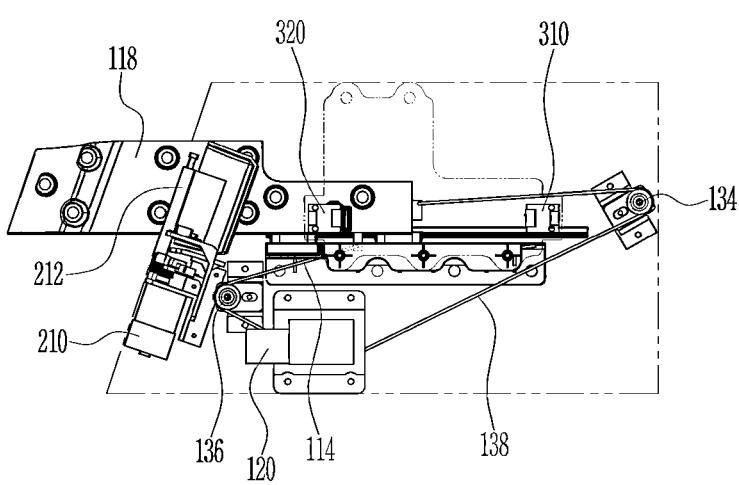

FIG. 9A and FIG. 9B are views exemplarily illustrating a process in which the armrest portion of the vehicle luggage armrest according to an exemplary embodiment of the present disclosure is drawn out from the luggage trim.

As illustrated in FIG. 9A, when the door opening signal is detected in a state where the armrest portion 100 is inserted into the luggage trim 9 (FIG. 9A), the drive motor 120 is driven, and accordingly, the main pulley 132, the first pulley 134, and the second pulley 136 rotate, so that the wire 138 moves the upper rail bracket 112 to the left. At the same time, the cover motor 212 is driven, and the luggage cover 210 rotates toward the inside of the luggage trim 9 by the rotation of the gear 216 coupled to the rotation shaft of the cover motor 212. Accordingly, the opening of the luggage trim 9 is opened. The upper rail bracket 112 and the armrest cover 110 moving to the left are drawn out through the opening of the luggage trim 9 (FIG. 9B).

Meanwhile, the luggage armrest 1000 may further include armrest position sensors 310 and 320 provided on the luggage trim 9 and detecting the position of the armrest portion 100. The armrest position sensors 310 and 320 may detect the position and movement amount of the armrest cover 110 and may stop movement of the armrest cover 110 when the armrest cover 110 has moved by a predetermined movement amount.

In various exemplary embodiments of the present disclosure, a controller is connected to armrest position sensors 310 and 320 to control the operations of the vehicle luggage armrest 1000.

Figure 10:
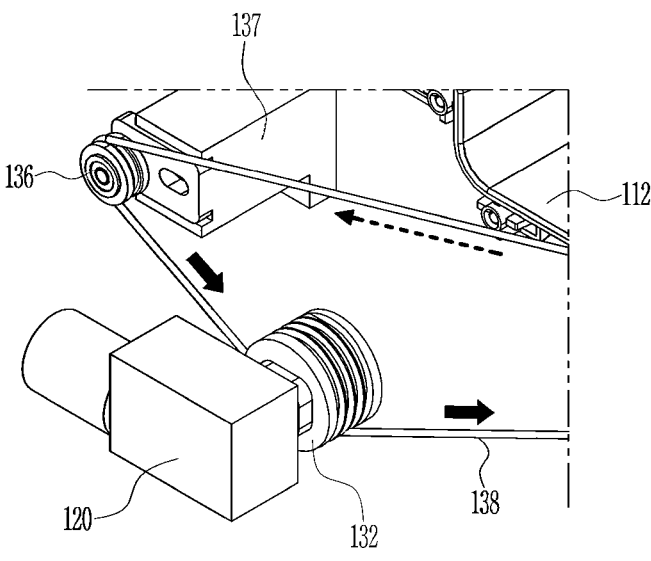
FIG. 10 is a view exemplarily illustrating a connection relationship between a drive motor and pulleys of the vehicle luggage armrest according to an exemplary embodiment of the present disclosure.

FIG. 10 is a view exemplarily illustrating a connection relationship between the drive motor and the pulleys of the vehicle luggage armrest according to an exemplary embodiment of the present disclosure.

Referring to FIG. 10, the main pulley 132 is coupled to the rotation shaft of the drive motor 120, and the main pulley 132 and the second pulley 136 are connected by the wire 138. As the drive motor 120 is driven, the main pulley 132 rotates, and accordingly, the second pulley 136 and the first pulley 134 rotate, so that the upper rail bracket 112 and the armrest cover 110 may move to the left and right. The second pulley 136 may be rotatably coupled to a pulley bracket 137 fixed to the vehicle body.

Figure 11A:
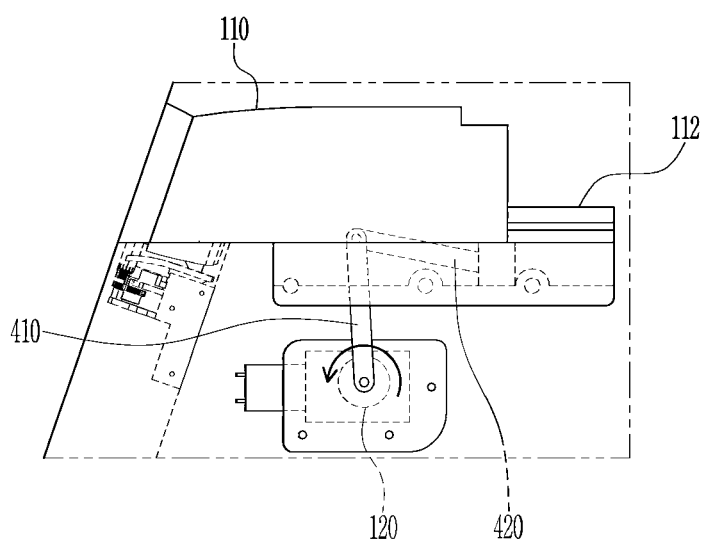
FIG. 11A and FIG. 11B are views exemplarily illustrating states in which an armrest portion of a vehicle luggage armrest according to another exemplary embodiment of the present disclosure is inserted into and drawn out from the luggage trim when viewed from the front.
Figure 11B:
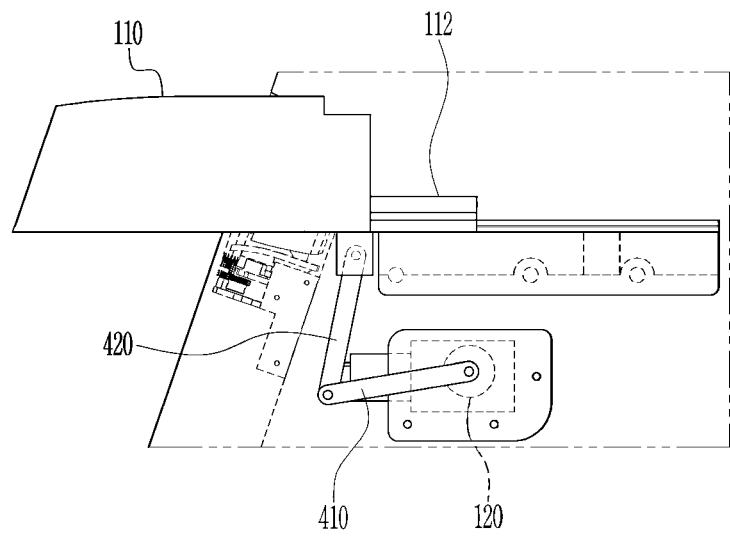
Figure 12:
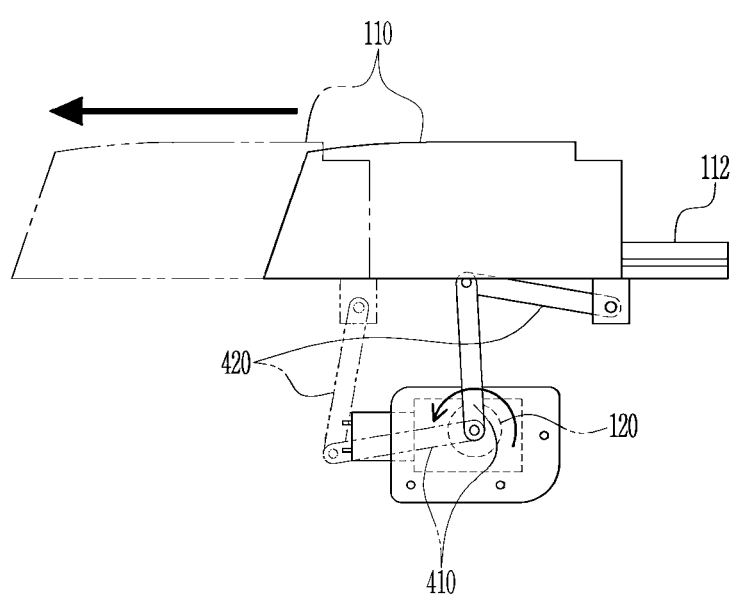
FIG. 12 is a view exemplarily illustrating a process in which the armrest portion of the vehicle luggage armrest according to another exemplary embodiment of the present disclosure is drawn out from the luggage trim.
Figure 13:
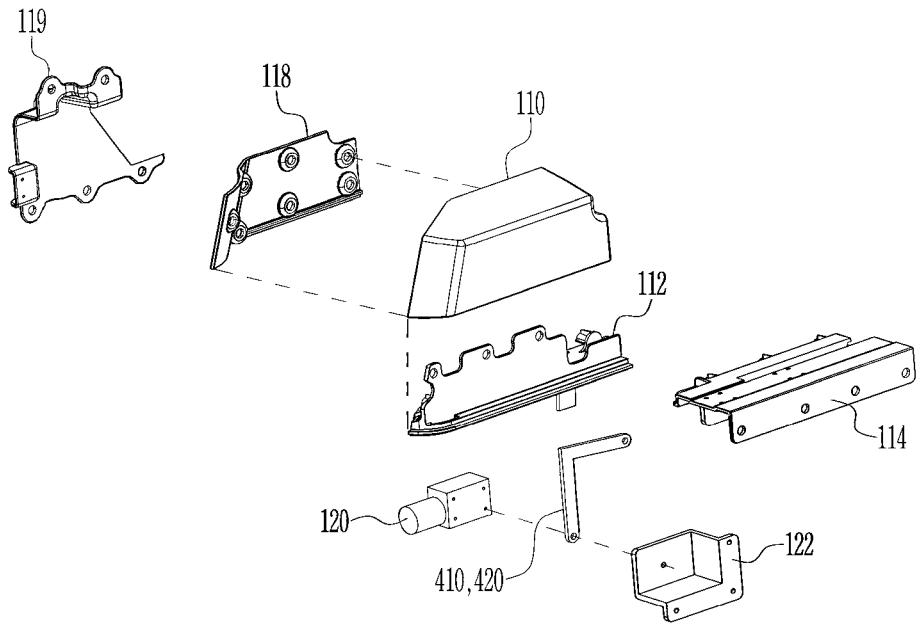
FIG. 13 is an exploded perspective view of the armrest portion of the vehicle luggage armrest according to another exemplary embodiment of the present disclosure.

FIG. 11A and FIG. 11B are views exemplarily illustrating states in which an armrest portion of a vehicle luggage armrest according to another exemplary embodiment of the present disclosure is inserted into and drawn out from the luggage trim. FIG. 12 is a view exemplarily illustrating a process in which the armrest portion of the vehicle luggage armrest according to another exemplary embodiment of the present disclosure is drawn out from the luggage trim. FIG. 13 is an exploded perspective view of the armrest portion of the vehicle luggage armrest according to another exemplary embodiment of the present disclosure.

As illustrated in FIGS. 11A to 12, the vehicle luggage armrest according to another exemplary embodiment of the present disclosure may use a link portion instead of using the pulleys 132, 134, and 136 and the wire 138 described with reference to FIGS. 4 to 10 to slide the upper rail bracket 112. The link portion includes a first link 410 and a second link 420.

That is, as illustrated in FIGS. 11A to 12, the first link 410 connected to a rotation shaft of a drive motor 120 and the second link 420 connected to the first link 410 may be used to move an upper rail bracket 112. The first link 410 may have one end portion coupled to the rotation shaft of the drive motor 120 and turn according to rotation of the rotation shaft of the drive motor 120. The second link 420 may have one end portion rotatably connected to the other end portion of the first link 410 and the other end portion coupled to the upper rail bracket 112.

In various exemplary embodiments of the present disclosure, a controller is connected to the drive motor 120 to control the operations of the vehicle luggage armrest 1000.

When a door closing signal is detected in a state where a luggage cover 210 is closed (FIG. 11A), the drive motor 120 is driven, and the first link 410 coupled to the rotation shaft of the drive motor 120 turns. Accordingly, the second link 420 rotatably connected to the other end portion of the first link 410 turns, so that the upper rail bracket 112 connected to the second link 420 may slide along a linear rail 116. At the same time, the opening of the luggage trim 9 is opened, and an armrest cover 110 is drawn out from the luggage trim 9 through the opened opening of the luggage trim 9 (FIG. 11B).

Because an operation method of a cover portion according to the door opening/closing signal is the same as that described above, a description thereof will be omitted.

As illustrated in FIG. 13, the armrest portion 100 includes the armrest cover 110, the upper rail bracket 112 coupled to a lower portion of the armrest cover 110, a lower rail bracket 114 disposed under the upper rail bracket 112, and the drive motor 120 providing a driving force to slide the upper rail bracket 112 along a linear rail on the lower rail bracket 114. The first link 410 is connected to the drive motor 120, and the second link 420 connected to the first link 410 is connected to the upper rail bracket 112. Accordingly, the upper rail bracket 112 may slide by the first link 410 and the second link 420 by driving of the drive motor 120. Meanwhile, a side cover 118 covers side surfaces of the armrest cover 110 and the upper rail bracket 112, and the side cover 118 may be fixed to the vehicle body by an external bracket 119.

As described above, according to an exemplary embodiment of the present disclosure, as the active luggage armrest structure that functions as an armrest when the hinged compartment door is closed, and slides in such a way as not to interfere with opening of the compartment door when the compartment door is opened by use of a drive motor and a pulley or link is provided, it is possible to secure an armrest space for supporting an arm of a passenger.

Furthermore, cost reduction and a predetermined degree of layout freedom may be achieved by not requiring a separate device in securing a space for an armrest and eliminating interference occurring in a process of opening and closing a sliding door.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory: The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the memory and the processor may be provided as one chip, or provided as separate chips.

In various exemplary embodiments of the present disclosure, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

In various exemplary embodiments of the present disclosure, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle luggage armrest apparatus provided in a luggage trim of a vehicle, the vehicle luggage armrest apparatus comprising:
an armrest portion on which an arm of a passenger is to be placed and which is configured to slide in a longitudinal direction of a vehicle body to be inserted into or drawn out from the luggage trim; and
a cover portion provided at an opening of the luggage trim and configured to open or close based on sliding of the armrest portion to be inserted into or drawn out from the luggage trim.

2. The vehicle luggage armrest apparatus of claim 1, wherein the armrest portion includes:
an armrest cover including an upper surface;
an upper rail bracket coupled to a lower portion of the armrest cover;
a lower rail bracket disposed under the upper rail bracket and positioned inside the luggage trim;
a linear rail fixed to an upper surface of the lower rail bracket and providing a sliding path for the upper rail bracket; and
a drive motor disposed inside the luggage trim and providing a driving force.

3. The vehicle luggage armrest apparatus of claim 2, further including a pulley portion coupled to a rotation shaft of the drive motor and by which the upper rail bracket slides.

4. The vehicle luggage armrest apparatus of claim 3, wherein the pulley portion includes:
a main pulley disposed inside the luggage trim, coupled to the rotation shaft of the drive motor, and rotating by driving of the drive motor; and

12 first and second pulleys engaged to the main pulley by a wire and rotating in synchronization with the main pulley, and
the wire fixed to the upper rail bracket and coupled between the first pulley and the upper rail bracket and between the upper rail bracket and the second pulley.

5. The vehicle luggage armrest apparatus of claim 4, wherein the first pulley is disposed on a rear side of the luggage trim, and the second pulley is disposed on a front side of the luggage trim.

6. The vehicle luggage armrest apparatus of claim 5, wherein each of the first pulley and the second pulley is rotatably coupled to a pulley bracket fixed to the vehicle body.

7. The vehicle luggage armrest apparatus of claim 2, wherein a side cover covers side surfaces of the armrest cover and the upper rail bracket.

8. The vehicle luggage armrest apparatus of claim 2, wherein the linear rail is connected to a linear guide disposed on the upper surface of the lower rail bracket in a longitudinal direction of the lower rail bracket.

9. The vehicle luggage armrest apparatus of claim 1, wherein the cover portion includes:
a luggage cover configured for rotating to open or close the opening of the luggage trim on a front side of the vehicle body;
a cover motor fixed inside the luggage trim and coupled to the luggage cover to provide a rotation force to the luggage cover; and
a cover motor bracket to which a rotation shaft of the luggage cover is rotatably coupled and to which the cover motor is fixed.

10. The vehicle luggage armrest apparatus of claim 9, wherein the cover portion further includes an open sensor and a close sensor that detect a position of the luggage cover.

11. The vehicle luggage armrest apparatus of claim 10, wherein the open sensor and the close sensor are provided on an open sensor bracket and a close sensor bracket, respectively, the open sensor bracket and the close sensor bracket being coupled to the cover motor bracket.

12. The vehicle luggage armrest apparatus of claim 1, further including armrest position sensors provided on the luggage trim and detecting a position of the armrest portion.

13. The vehicle luggage armrest apparatus of claim 9, wherein a rotation shaft of the cover motor is connected to the rotation shaft of the luggage cover by a gear, and the luggage cover rotates by rotation of the cover motor.

14. The vehicle luggage armrest apparatus of claim 2, further including a link portion connected to a rotation shaft of the drive motor and by which the upper rail bracket slides.

15. The vehicle luggage armrest apparatus of claim 14, wherein the link portion includes:
a first link including a first end portion connected to the rotation shaft of the drive motor and turning; and
a second link including a first end portion rotatably connected to a second end portion of the first link and a second end portion coupled to the upper rail bracket, and turning together with the first link by the driving motor to slide the upper rail bracket.

16. A method of controlling a vehicle luggage armrest apparatus provided in a luggage trim of a vehicle including an armrest portion slidably mounted in the luggage trim with an opening, the method comprising:
sliding, by a controller, the armrest portion in a longitudinal direction of a vehicle body to be inserted into or drawn out from the luggage trim through the opening; and opening or closing, by the controller, a cover portion provided at the opening based on sliding of the armrest portion.

\* \* \* \* \*